(12) United States Patent
Weber et al.

(10) Patent No.: US 10,995,818 B2
(45) Date of Patent: May 4, 2021

(54) TORQUE-TRANSMISSION DEVICE

(71) Applicant: ZF FRIEDRICHSHAFEN AG, Friedrichshafen (DE)

(72) Inventors: Paul Weber, Geldersheim (DE); Daniel Pittner, Frohburg (DE); Peter Hammer, Schweinfurt (DE); Alexander Strom, Bad Kissingen (DE); Kyrill Siemens, Würzburg (DE); Steffen Einenkel, Priesendorf (DE); Peter Frey, Gerolzhofen (DE); Wolfgang Grosspietsch, Schweinfurt (DE); Christoph Sasse, Schweinfurt (DE); Martin Hertel, Bergrheinfeld (DE); Alexander Manger, Grettstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 125 days.

(21) Appl. No.: 16/313,448

(22) PCT Filed: May 29, 2017

(86) PCT No.: PCT/EP2017/062836
§ 371 (c)(1),
(2) Date: Dec. 26, 2018

(87) PCT Pub. No.: WO2018/001662
PCT Pub. Date: Jan. 4, 2018

(65) Prior Publication Data
US 2019/0226550 A1 Jul. 25, 2019

(30) Foreign Application Priority Data

Jun. 30, 2016 (DE) .......................... 102016211945.1

(51) Int. Cl.
*F16F 15/123* (2006.01)
*F16F 15/14* (2006.01)
(Continued)

(52) U.S. Cl.
CPC ........ *F16F 15/12353* (2013.01); *B60K 6/387* (2013.01); *B60K 6/40* (2013.01);
(Continued)

(58) Field of Classification Search
CPC .................. B60K 6/38; B60K 6/40–48; F16F 15/123–15/1485
See application file for complete search history.

(56) References Cited

U.S. PATENT DOCUMENTS

2010/0242466 A1* 9/2010 Krause .................. F16F 15/167 60/327
2011/0088958 A1* 4/2011 Ebert ....................... B60K 6/40 180/65.22
(Continued)

FOREIGN PATENT DOCUMENTS

DE    10 2009 024 217        12/2009
DE       102010030690 A1 *   1/2012 ............... B60K 6/40
(Continued)

Primary Examiner — Ernesto A Suarez
Assistant Examiner — Lillian T Nguyen
(74) Attorney, Agent, or Firm — Cozen O'Connor

(57) ABSTRACT

A torque transmission device for a powertrain of a motor vehicle has an input area and an output area. A torque path runs from the input area to the output area. A torsional vibration damping unit is positioned first, followed by a gear unit, along the torque path between the input area and the output area. The torsional vibration damping unit provides a first spatial area and an adjoining second spatial area along the torque path, and the gear unit provides an adjoining third spatial area.

17 Claims, 15 Drawing Sheets

(51) Int. Cl.
*F16H 57/028* (2012.01)
*B60K 6/48* (2007.10)
*F16H 57/02* (2012.01)
*B60K 6/40* (2007.10)
*B60K 6/387* (2007.10)
*F16H 57/021* (2012.01)

(52) U.S. Cl.
CPC .............. *B60K 6/48* (2013.01); *F16F 15/123* (2013.01); *F16F 15/145* (2013.01); *F16H 57/02* (2013.01); *F16H 57/028* (2013.01); *B60K 2006/4825* (2013.01); *B60Y 2200/92* (2013.01); *B60Y 2400/48* (2013.01); *F16H 2057/0216* (2013.01); *F16H 2057/02086* (2013.01); *Y02T 10/62* (2013.01)

(56) References Cited

U.S. PATENT DOCUMENTS

| | | |
|---|---|---|
| 2011/0259698 A1 | 10/2011 | Arnold et al. |
| 2012/0001504 A1* | 1/2012 | Erfanfar ............... H02K 9/19 |
| | | 310/54 |
| 2013/0068580 A1* | 3/2013 | Doegel ................. F16D 47/06 |
| | | 192/3.28 |
| 2013/0087425 A1* | 4/2013 | Frait ...................... F16H 61/62 |
| | | 192/3.25 |
| 2014/0345553 A1* | 11/2014 | Fambach ............. F16F 15/134 |
| | | 123/179.1 |
| 2015/0114787 A1* | 4/2015 | Brevick ................. F16D 13/38 |
| | | 192/66.32 |
| 2015/0211583 A1 | 7/2015 | Jugovic |
| 2016/0084363 A1* | 3/2016 | Steinberger ............ B60K 6/00 |
| | | 192/3.28 |

FOREIGN PATENT DOCUMENTS

| | | |
|---|---|---|
| DE | 10 2014 206 330 | 10/2014 |
| DE | 10 2014 208963 | 12/2014 |
| DE | 10 2015 201 306 | 8/2015 |
| DE | 11 2014 001 528 | 1/2016 |
| DE | 10 2014 222 644 | 5/2016 |
| DE | 11 2014 003 986 | 5/2016 |
| EP | 1 736 345 | 12/2006 |
| FR | 2 814 516 | 3/2002 |
| WO | WO 2004/003399 | 1/2004 |
| WO | WO 2015/092216 | 6/2015 |

* cited by examiner

TORQUE-TRANSMISSION DEVICE

CROSS REFERENCE TO RELATED APPLICATIONS

This is a U.S. national stage of application No. PCT/EP2017/062836, filed on May 29, 2017. Priority is claimed on German Application No. DE102016211945.1, filed Jun. 30, 2016, the content of which is incorporated here by reference.

BACKGROUND OF THE INVENTION

1. Field of the Invention

The present invention is directed to a torque transmission device for a powertrain of a motor vehicle with an input area formed principally by an internal combustion engine, a downstream torsional vibration damping unit, a transmission arrangement, and a downstream output area formed principally by a transmission output shaft.

2. Description of the Prior Art

A torque transmission device in which a torsional vibration damping arrangement with a mass damper in a housing area is provided between a drive unit and a gear unit is known from the prior art in DE 10 2014 206 330 A1.

US 2011259698 AA also shows a torque transmission device with a torsional vibration damping arrangement comprising a torsional damper and a mass damper in a housing area upstream of a gear unit.

However, it is disadvantageous in this torque transmission device known from the prior art that the individual components, which are responsible for reducing torsional vibrations and for transmitting torque, are not provided or arranged in the torque transmission device in an advantageous, space-saving, or economical manner in accordance with their operation.

SUMMARY OF THE INVENTION

Therefore, it is an object of one aspect of the present invention to provide a torque transmission device in which torsional vibrations are reduced and torque is transmitted in an efficient, space-saving and economical manner.

The invention provides a torque transmission device for a powertrain of a motor vehicle which comprises an input area rotatable around a rotational axis (A), an output area rotatable around a rotational axis (B), and a torque path (M) running from the input area to the output area. A torsional vibration damping unit is positioned first, followed by a gear unit, along the torque path (M) between the input area and the output area. The torsional vibration damping unit provides a first spatial area and an adjoining second spatial area along the torque path (M), and the gear unit provides an adjoining third spatial area.

The spatial areas are formed such that the first spatial area is delimited from the second spatial area and the second spatial area is delimited from the third spatial area such that no viscous medium, for example, oil or grease, can pass from one spatial area to an other spatial area. Further, the input area can be formed chiefly by an output element of a drive unit, for example, a crankshaft of an internal combustion engine. The output area can be formed, for example, by an output shaft of the gear unit.

An advantageous embodiment form provides that an axial offset compensation unit and/or an angular offset compensation unit and/or a first spring set are/is provided in the first spatial area in the torque path (M). The axial offset compensation unit and the angular offset compensation unit may be primarily formed by a flexplate arrangement at an axial offset or angular offset. The spring set can be constructed as a known dual mass flywheel or as a known mechanical torsional damper (MTD).

In a further advantageous construction, a mass damper unit, in particular a speed-variable mass damper or a fixed-frequency mass damper or a mass damper for two or more engine orders is provided in the second spatial area in torque path (M). Any known mass damper variant can be used for this purpose. It should be mentioned in connection with the foregoing embodiment form that an advantageous torsional vibration damping in the torque path M is achieved when a spring set, for example, a dual mass flywheel or a mechanical torsional damper, is provided first and a mass damper variant provided subsequently along the torque path M from the input area to the output area.

Further, it can be advantageous when a second spring set or further spring sets is or are provided in the second spatial area downstream of the mass damper unit in torque path (M). A further torsional vibration reduction can advantageously be achieved in this way.

In a further advantageous construction, the gear unit comprises a transmission arrangement, particularly an automatic planet gear transmission or a manual or automatic shift transmission. An automatic planetary transmission is also known in this connection as an automatic transmission. Further, a dual clutch transmission can be used.

Further, it can be advantageous when the first spatial area is a dry space, the second spatial area is a moist space, and the third spatial area is a wet space. The choice is made such that the component parts, advantageously dry component parts as is the case in a dual mass flywheel, for example, are installed in the dry space. While the dual mass flywheel has a grease filling, it is constructed so as to be enclosed so that advantageously no grease or other viscous medium can escape during operation. Accordingly, the dual mass flywheel is advantageously used in the dry space. Also, the dry space is preferably open on the side facing the drive unit so that it is hardly possible to seal this space on this side.

In a further construction, the second spatial area, which is a moist space in this case, receives the component parts of the torque transmission arrangement, which should advantageously operate in a moist space containing oil mist. This means that there are component parts arranged in this instance through which a defined and specifically directed oil flow does not pass. When advantageously used, for example, a spring set or a plurality of spring sets and the mass damper unit are operated in the moist space. The spring sets can be constructed in such a way that they are not surroundingly enclosed, but rather the oil mist contained in the moist space can be used as lubricant. It is likewise advantageous to operate the mass damper unit in the moist space because the mass damper unit does not require a specific oil flow; rather, lubrication with an oil mist is sufficient. Therefore, the moist space is only filled with a small amount of a viscous medium. The viscous medium such as oil or a grease emulsion serves to minimize friction and wear. The third spatial area is advantageously a wet space in this case. The wet space is characterized in that it is filled with oil or another viscous medium such that the component parts received in the wet space which advantageously comprise a transmission arrangement run in an oil bath and/or such that a directed oil flow passes through them. As such, the wet space presents the greatest demand for sealing relative to the environment and the second spatial area.

Further, it can be advantageous when the first spatial area is separated from the second spatial area by a separate separating element. This embodiment form is particularly advantageous because the second spatial area with the component parts such as, for example, the mass damper unit or a spring set can be provided with further component parts such as an electric motor and a disconnect clutch. After these component parts have been installed in this second spatial area, this spatial area can be closed in an oil-tight manner with the separate separating element. A sealing of the separating element is carried out radially outside via a circumferential ear ring, whereas the sealing radially inside relative to a radially inwardly extending shaft advantageously formed by a transmission input shaft is carried out by a radial shaft sealing ring. The separating element can be constructed as a sheet metal part, a cast part, a turned part or as a carbon fiber reinforced plastic part. In an advantageous embodiment, the separating element is adapted to the shape of the component parts in the first spatial area and second spatial area. This means that there is the least possible axial distance between the component part in the first spatial area and the component part in the second spatial area. This is advantageous for a compact axial construction.

In another advantageous embodiment form, the separating element is provided with a radially outwardly circumferential seal. As has already been described, the sealing of the separating element on the radially outer side is carried out via a circumferential sealing ring which is advantageously formed by an ear ring.

Further, it may be advantageous that the second spatial area is separated from the third spatial area by a separate separating element, or the separating element is formed integrally with a housing element of the torsional vibration damping unit or integrally with a housing element of the gear unit. The separation of the second spatial area from the third spatial area can be carried out similar to the sealing of the first spatial area relative to the second spatial area, namely, with the separating element which is used as a separate component part. However, it is also possible that the separating element is formed integrally with the housing element of the gear unit. Sealing on the radially inner side is principally carried out through a radial shaft sealing ring.

Further, it can be provided that the housing element of the torsional vibration damping unit and the housing element of the gear unit are formed integrally. The housing element of the torsional vibration damping unit and the housing element of the gear unit are constructed as one component part, advantageously as an aluminum casting. This means, further, that the three spatial areas, namely, the dry space, the moist space, and the wet space, are formed by an individual housing element. This is particularly advantageous in the production of and marketing of the torque transmission arrangement because the component part, namely, the torque transmission arrangement, is an individual compact unit forming the three spatial areas of dry space, moist space and wet space. To further clarify, this is a transmission in which the previously known bell housing is formed of two parts, namely, as dry space and moist space, whereas the third spatial area receives the actual transmission, for example, the automatic transmission or a manual transmission, or automatic shift transmission.

In a further advantageous embodiment form, the first spring set is formed of one or more rows. The single-row spring set is especially advantageous because it is compact and can be operated with an arc spring as well as with a straight helical compression spring or helical compression spring sets. However, it is also possible to form the spring set in a plurality of rows. This means that there are additional spring sets formed mainly radially inside or radially outside or in an axial parallel construction. The efficiency of the spring set can be enhanced in this way.

It can be advantageous when the second spring set or the further spring sets is or are formed in one or more rows. The advantages of the one-row or multiple-row second spring set are the same as those described for the first spring set.

It can also be provided that an electric drive unit is provided in the torque path in the first spatial area and/or in the second spatial area. In case of a hybridized torque transmission arrangement, the first spatial area and the second spatial area are especially suitable for arranging the electric drive unit, i.e., an electric motor. When the electric motor is arranged in the first spatial area, it can be mounted on the crankshaft, for example, as a known 48-volt electric motor which protrudes into the first spatial area. However, it is also possible to operate the electric motor by a disconnect clutch when the electric motor is put in the second spatial area with this advantageous embodiment form, usually with a disconnect clutch, which interrupts the torque flow from the conventional drive unit of every internal combustion engine when the electric motor is turned on. The electric motor is arranged concentric to the transmission input shaft. In an advantageous embodiment form, the stator is fastened radially outwardly to the housing so as to be fixed with respect to rotation relative to it, whereas the rotor is operatively connected to the disconnect clutch. The disconnect clutch which is principally constructed as a wet multiple plate clutch is positioned radially inside of the rotor for a compact construction. The disconnect clutch can be controlled electrically or hydraulically.

Further, a disconnect clutch can be provided in the torque path upstream of the electric drive unit. The disconnect clutch can interrupt the torque path from the input area to the output area, and a torque which is generated by the electric drive unit runs to the output area.

In a further advantageous configuration, the disconnect clutch is suitable for conducting the torque or torque components from the input area to the output area. The disconnect clutch can be constructed in such a way that it is used not only as an open-close clutch but is also used as a slip clutch. This means that the clutch does not transmit the full rotational speed from the internal combustion engine to the transmission input shaft.

It can also be advantageous that rotational axis (A) extends coaxial to rotation axis (B) or that rotational axis (A) extends at an axial offset to rotational axis (B). Rotational axes A and B advantageously extend coaxially in case of a rear longitudinal drivetrain. In front transverse applications, the rotational axes A and B, i.e., the rotational axis of the input area and of the output area, extend at an axial offset.

Further, the transmission arrangement can provide a starting element in the torque path. An internal starting element, as it is called, can also be considered for this purpose. When the transmission arrangement is an automatic planet gear transmission, a planetary gear set with brake can be used as starting element. Therefore, the internal starting element can replace a known starting element, for example, a torque converter, or a friction clutch. However, a starting element in the form of a further clutch can also be provided in the transmission.

In a further advantageous construction, the starting element is constructed in particular as a friction clutch or a multiple plate clutch or a multiple disk brake. The friction clutch or the multiple plate clutch or the multiple disk brake is advantageously constructed as a wet type. Further, it can be advantageous that the electric drive unit comprises a rotor and a stator, the rotor being provided in the torque path. The rotor can be connected to the transmission input shaft so as to be fixed with respect to rotation relative to it.

BRIEF DESCRIPTION OF THE DRAWINGS

The invention will be described more fully in the following referring to diagrams. The embodiment examples shown in the drawings only depict preferred constructions and shall not limit the scope of the invention which is defined solely by the appended claims.

The drawings show.

Like or identically functioning component parts are designated by like reference numerals in the following.

DETAILED DESCRIPTION OF THE PRESENTLY PREFERRED EMBODIMENTS

Figure 1:
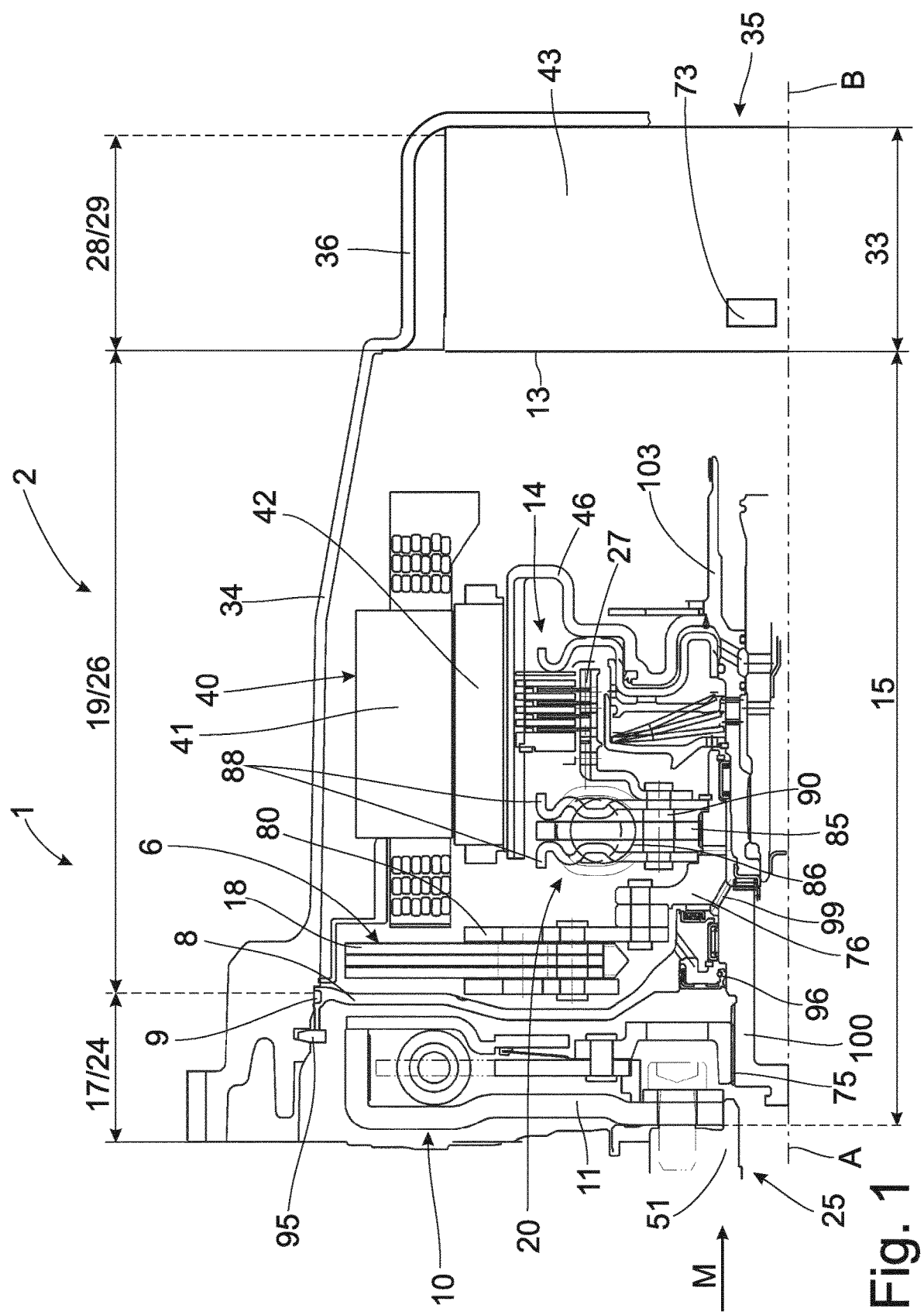
FIG. 1 is a schematic view of a torque transmission arrangement according to the invention.

FIG. 1 shows a torque transmission arrangement 1 for an automatic hybrid transmission 2. A basic construction is as follows in a sequence of a torque path M from an input area 25 which can be formed, for example, by an internal combustion engine to an output area 35, which can be formed, for example, by an output shaft of a transmission. The torque transmission arrangement is divided into three spatial areas. A first spatial area 17, which may also be referred to as dry space 24, a subsequent second spatial area 19, which may also be referred to as moist space 26 and a subsequent third spatial area 28 which may also be referred to as wet space 29. The second spatial area 19 is separated from the third spatial area 28 by a separating element 13. A rotor 42 of an electric machine is arranged in the second spatial area 19. The third spatial area 28 is delimited by a housing element 36. According to one aspect of the invention, an automatic planetary transmission 43 is arranged in the third spatial area 28. The automatic planetary transmission 43 comprises a starting element 73 configured as a brake or a clutch. A first torsional damper 10 is located in the first spatial area 17 and is constructed as a dual mass flywheel. This first torsional damper 10 can be operated with a grease filling and is preferably placed in the dry space, which does not contain any viscous medium. The second torsional damper 20 is integrated in the second spatial area 19 and is accordingly located in the moist space 26, which constitutes a working space that contains oil mist but is not filled with oil. A speed-adaptive mass damper 6 is arranged between the two torsional dampers 10, 20. This speed-adaptive mass damper 6 is likewise located in the oil mist-containing moist space 26. The ratio of an axial installation space height of the dry space 24 to the moist space 26 of the torque transmission arrangement 1 is between 1:3 and 1:5.

The advantages in this variant are an efficient and economical use of installation space and a resulting high-quality decoupling of rotational irregularities introduced from the drive unit, for example, the internal combustion engine. Consequently, there is more radial installation space available for the mass damper unit 6 as a result of dispensing with a hydrodynamic torque transmission and enclosing housing, i.e., by dispensing with a hydrodynamic torque converter in the torque transmission arrangement 1. In this way, the mass damper unit 6 can be moved very close to an installation space boundary, in this case a housing element 34 of the second spatial area 19, which may also be referred to as transmission housing. Taking into account a tolerance situation, a ratio between an outer diameter of the damper masses 18 and the transmission housing diameter can be designed to a technically meaningful interval of 0.9 to 0.98. These interval limits refer to a maximum installation space on the order of a damper mass diameter of 300±20 mm which is determined by the geometry of the transmission housing.

An efficiency of the speed-adaptive mass damper 6 can be described by a parameter MDAT1000. This parameter describes the maximum restoring torque of the speed-adaptive mass damper 6 available at a speed of 1000 min-1. Accordingly, MDAT1000 is a meaningful ancillary quantity for defining the efficiency of a speed-adaptive mass damper 6 to compensate for rotational irregularities of an internal combustion engine. By making use of the radial installation space, MDAT1000 can be very high in spite of a confined axial installation space situation. The quotient of MDA1000 [Nm] and the axial installed height of the speed-adaptive mass damper 6 [mm], with a material thickness of the track plates of the speed-adaptive mass damper 6 included in the measurement, lies within technically meaningful interval limits of 4 to 8.5 [Nm/mm]. In addition, the speed-adaptive mass damper is scalable for ideal coverage of different internal combustion engines with different numbers of cylinders. The scaling is realized by adding or removing individual stacks or rows of damper masses 18 and accordingly also provides a basis for a modular system by different stacking.

The torque M is introduced into the torque transmission arrangement 1 from a crankshaft 51 via a primary plate 11 into the first torsional damper 10 constructed in this instance as a dual mass flywheel. The torque M is conveyed further from the first torsional damper 10 via a spline 75 to a hub 76 of the mass damper 6. Hub 76 is an integrative component part which, among other things, implements the routing of the torque from the dry working space 24 into the moist, oil mist-containing working space 26. The mass damper unit 6 is riveted to the damper hub 76 via a planar right-hand track plate 80. The torque is conveyed from the damper hub 76 to a hub disk 85 of the second torsional damper 20 in the oil mist-containing working space 26 via a second spline. The second torsional vibration damper 20 comprises a hub disk 85 with an inner toothing, a plurality of cylindrical helical compression springs 86 or, optionally, curved helical compression springs and two symmetrical cover plates 88. A torsional damper spring characteristic can have one or more steps. The two cover plates 88 are joined together via a plurality of spacer pieces 90 at an inner disk carrier 27 of a disconnect clutch 14. The cover plates 88 can have a double S-curve geometry in cross section to increase inherent stiffness. A spreading-apart motion due to centrifugal force and radial spring contact at high speeds is counteracted in this way. The combustion engine torque M is routed on the output side via the inner disk carrier 27 into the disconnect clutch which may also be referred to as a K0-clutch.

A further advantage consists in the positioning of the second torsional damper 20 radially inside of a rotor carrier 46 of an electric drive unit 40 which is positioned inside of the moist space 26. In this way, the existing installation space can be utilized very efficiently and there is a direct force flux from the second torsional damper 20 into the disconnect clutch 14 so that the inner disk carrier 27 can be constructed compactly and inexpensively. Taking into account the tolerance situation, a ratio between the outer diameter of the cover plates 88 and the rotor carrier diameter can be designed to a technically meaningful interval of 0.9 to 0.98. These interval limits refer to a maximum installation space on the order of magnitude of diameter of 170±20 mm, which is determined by the geometry of the rotor carrier 46. The second torsional vibration damper 20 is limited with respect to its efficiency through its small radial extension. However, this is substantially overcompensated through the use of the upstream high-performance speed-adaptive mass damper 6 resulting in a very high-quality decoupling of rotational irregularities. A stiffness ratio between the first torsional damper 10 and second torsional damper 20 is between 1:7 and 1:10. In this regard, a ratio between the outer spring diameters of the first torsional damper 10 and the second torsional damper 20 is approximately 1±0.3.

A separation of the dry working space 24 from the moist working space 26 is carried out through a partition plate 8, referred to herein as end shield, which is mounted in the transmission casing. In FIG. 1, the end shield 8 is constructed as a die-cast aluminum component part. A gap between the end shield and the transmission casing 34 at the outer diameter of the end shield 8 is sealed by a static O-ring seal 9. The end shield 8 is axially secured to the casing 34 via a snap ring 95. A radial shaft sealing ring 96 which ensures a dynamic seal between the stationary end shield 8 and the damper hub 76 rotating at the speed of the internal combustion engine is located at the inner diameter of the end shield 8.

Two radial rolling element bearings and axial rolling element bearings, also shown here as needle bushes, are provided in each instance for bearing support of the damper hub 76. The needle bushes are supported in the end shield 8 on the engine side. Support is carried out on the transmission side at a rotor hub 103, which is welded to the rotor carrier 46 of the electric motor. An adjustment of an axial mounting clearance is carried out by an adjusting disk positioned between the thrust bearing at the end shield 8 and the damper hub 76. The radial offset between the crankshaft and a transmission input shaft is completely compensated by the dual mass flywheel 10. To ensure the required long-term operational performance, the tribological systems in the oil mist-containing working space 26 are supplied with a defined lubricating oil volume flow. In so doing, a lubricating oil volume flow is injected from the transmission input shaft 100 through a diaphragm resistance into a blind hole bore of the damper hub 76. This lubricating oil volume flow is distributed to the tribological systems of rolling element bearings, track of the damper masses 18 and contact area between torsion spring and cover plates or hub disk via a plurality of transverse bores 99 in the damper hub. The supporting ring geometry of the mass damper 6 is configured such that the lubricating oil volume flow divided by the transverse bores is guided in a defined manner to the tracks of the damper masses 18 and the track plates 80.

Figure 2:
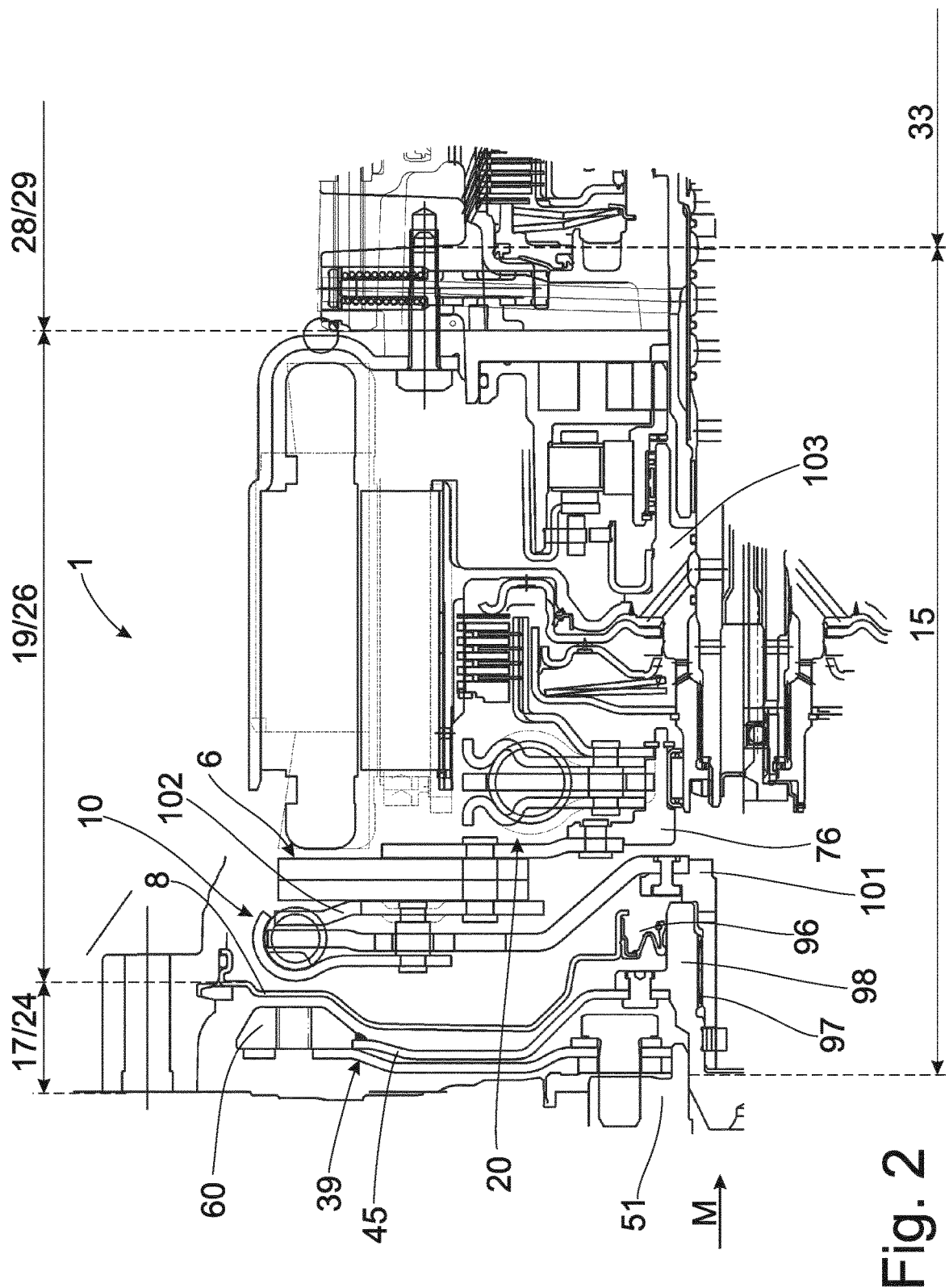
FIGS. 2 to 13 are further constructional variants of the torque transmission arrangement according to the invention.

Another possible construction of a torque transmission arrangement 1 is shown in FIG. 2. In contrast to FIG. 1, the first torsional damper 10 is arranged downstream of the end shield 8 so that the entire torsional vibration damping arrangement formed in this instance by the first torsional damper 10, mass damper unit 6, and second torsional damper 20 is located in the oil mist-containing working space 26. The advantage of this construction consists in the efficient utilization of the existing installation space simultaneously accompanied by high-quality decoupling of rotational irregularities. Owing to the fact that the entire torsional vibration damping arrangement is completely integrated in the housing element 34, the whole system, i.e., the torsional vibration damping unit 15 with the gear unit 33, can be supplied to customers as a whole.

In contrast to FIG. 1, the torque path M is not effected via a dual mass flywheel but rather via a flexplate 39 screwed to a connection plate 45, also referred to as drive plate. The flexplate 39 can also be configured as an axial offset compensation unit or an angular offset compensation unit. The connection plate 45 is in turn riveted to an outer intermediate hub 98 radially centered at the crankshaft 51. A sealing seat for a radial shaft sealing ring 96 is located on this outer intermediate hub 98 to separate the dry space 24 from the moist space 26. The radial shaft sealing ring 96 is mounted in the one-part end shield/partition plate 8, which preferably comprises a thin-walled sheet steel in this instance. The routing of the torque from the outer intermediate hub 98 to the inner intermediate hub 101 operatively connected to the first spring set 10 is carried out via a preloaded spline 97.

The right-hand cover plate 102 of the first torsional damper 10 serves simultaneously as left-hand track plate of the speed-adaptive mass damper 6. To this end, the track plate has local indentations so that the rivet heads of the spacer pieces vanish completely in the contact plane of the track plate and there is therefore no impairment of the free movement space of the damper masses 18. The torque is conveyed via the right-hand track plate into the torsional damper hub of the second torsional damper 20. The rest of the functional path up to the disconnect clutch is carried out analogous to the variant described in FIG. 1. The axial support of the damper hub 76 is carried out on the engine side via a thrust bearing at the intermediate hub of the first torsional damper 10 and on the transmission side via a thrust bearing at the rotor hub 103.

In order to increase a primary inertia upstream of the first torsional damper 10, a mass ring 60 is joined to the connection plate/drive plate 45. Combined with an optional starter ring gear, not shown here, the mass inertia upstream of the torsional vibration damping unit 15 is selectively increased in this way.

Figure 3:
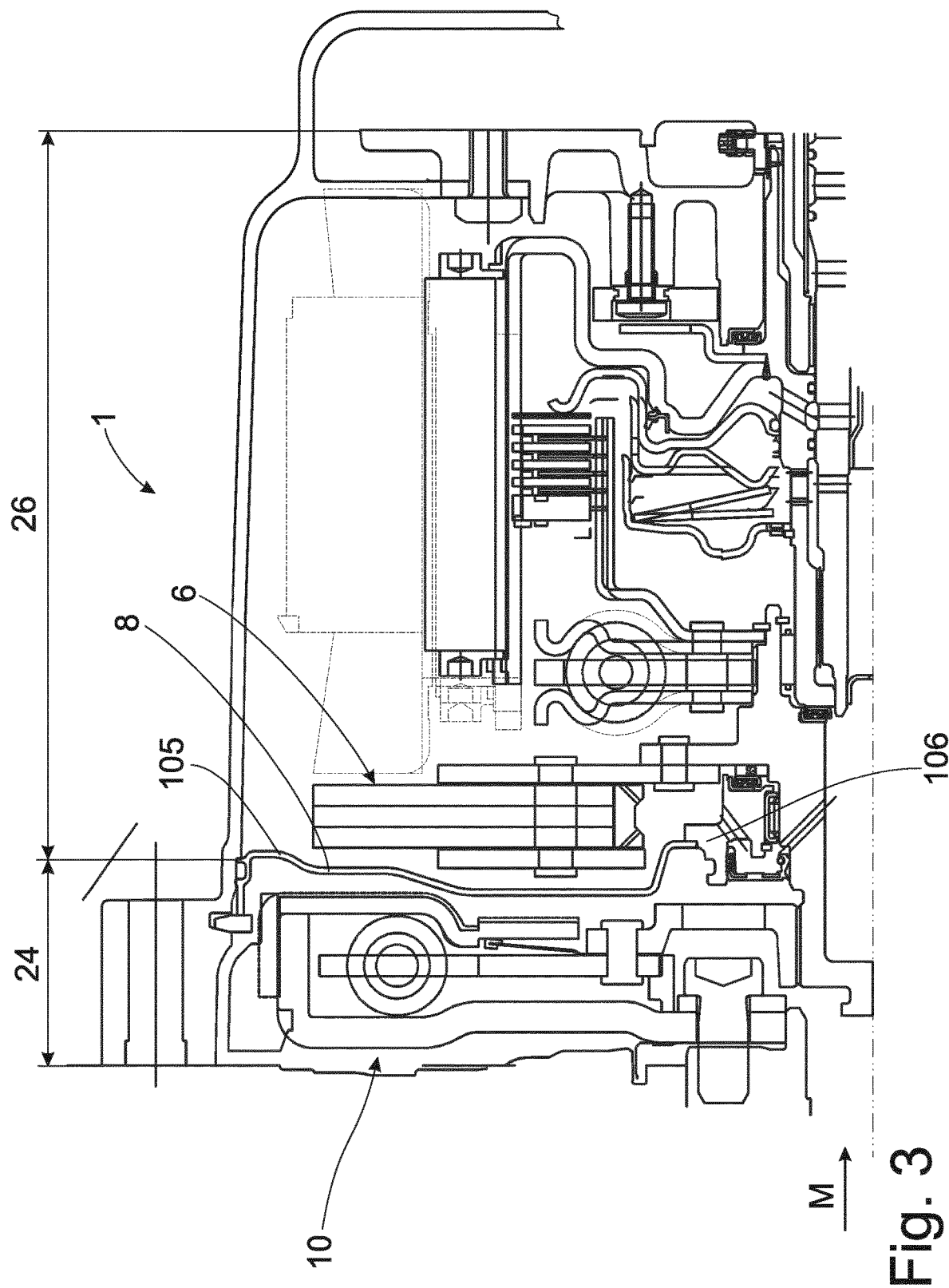

FIG. 3 shows an embodiment form as described in FIG. 1, but in which the end shield 8 is formed as a two-part component between the dry space 24 and the moist space 26. The outer portion is a thin-walled deep-draw sheet 105 comparable to that described referring to FIG. 2, which is joined radially inwardly to a cast flange 106. The rolling element bearing and dynamic seal are integrated in this cast flange 106 in a manner analogous to the description referring to FIG. 1. Because of the small plate thickness of the end shield 8 in the area of the bottlenecks between the circumferential structural component parts, in the present case, the dual mass flywheel 10, which is also known as a first torsional damper, and the mass damper unit 6, there is more axial installation space available compared to FIG. 1 for the dual mass flywheel 10 and the damper mass unit 6 to perform their functions.

Figure 4:
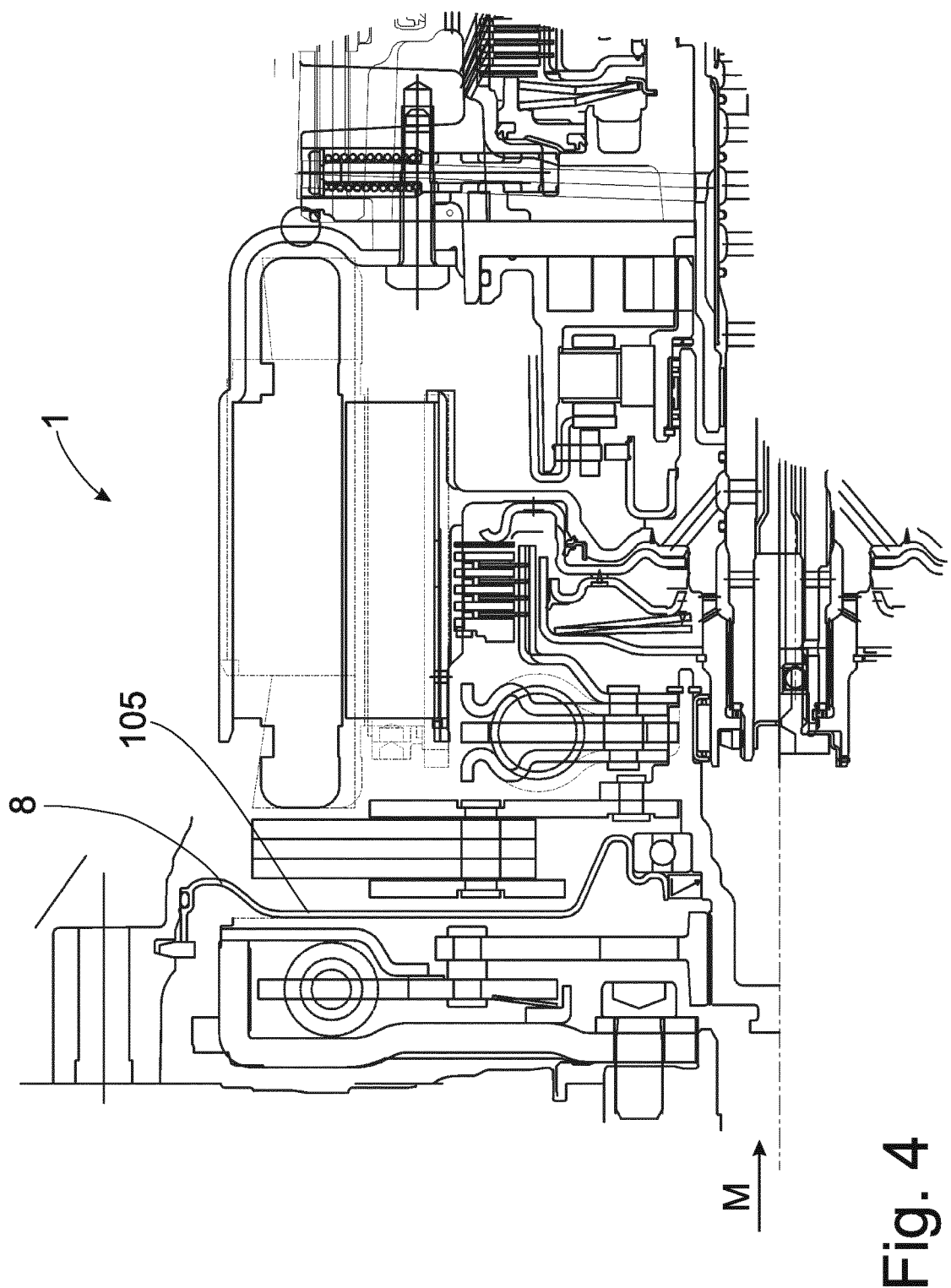

FIG. 4 shows an end shield 8 made entirely from a thin-walled deep-draw sheet metal. In contrast to the variant described in FIG. 1, a grooved ball bearing is used as rolling element bearing instead of two needle bushes.

Figure 5:
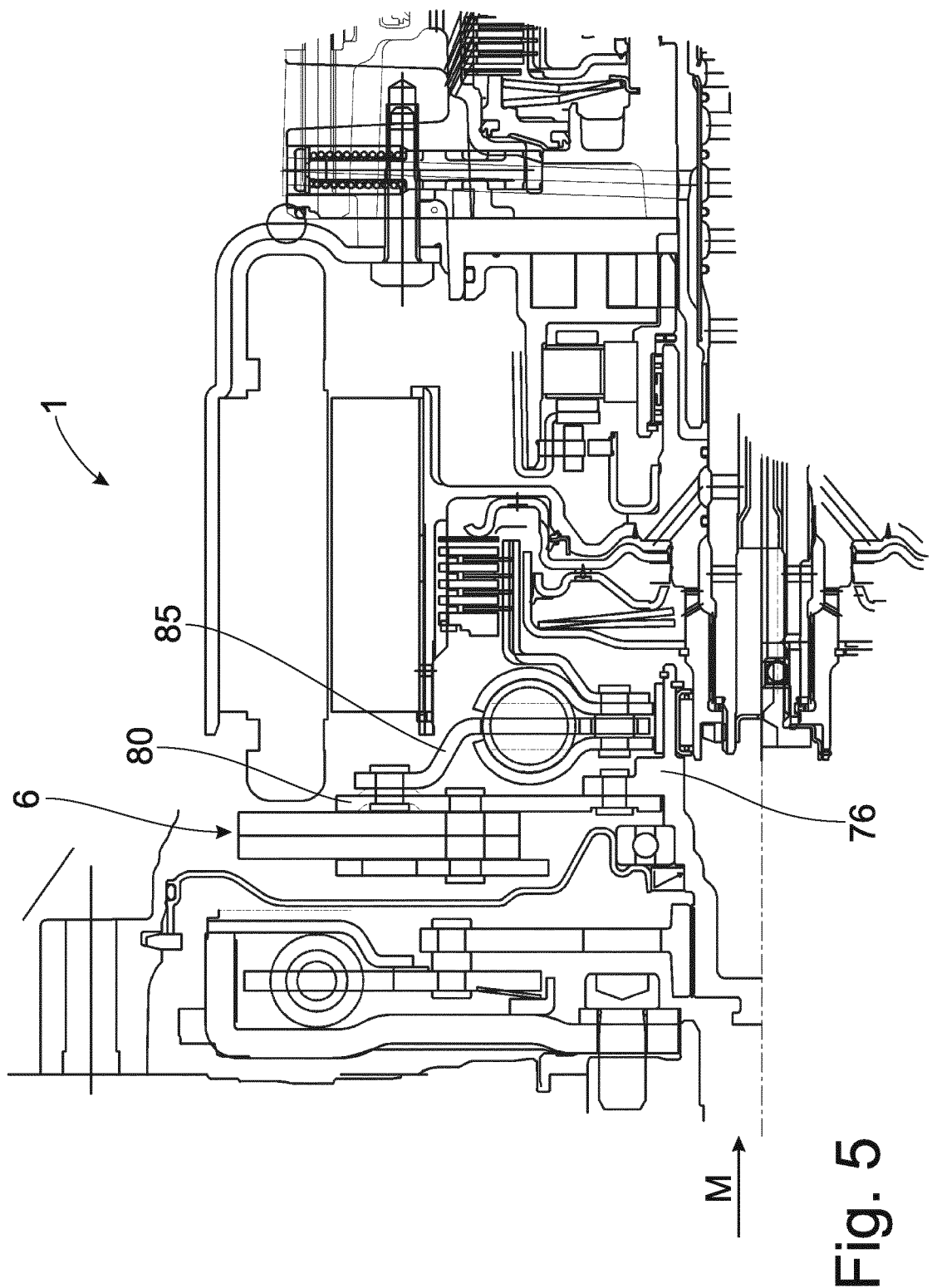

FIG. 5 shows an arrangement as described in FIG. 4, but with a modified control of the second torsional damper 20. In this case, the hub disk 85 is riveted to the right-hand track plate 80 of the mass damper unit 6. Accordingly, torque is introduced into the second torsional damper 20 from radially outside and not from radially inside as described in FIG. 1. Accordingly, there is no need for a second spline at the damper hub 76 so that the component part is less complicated and can accordingly be constructed more economically.

Figure 6:
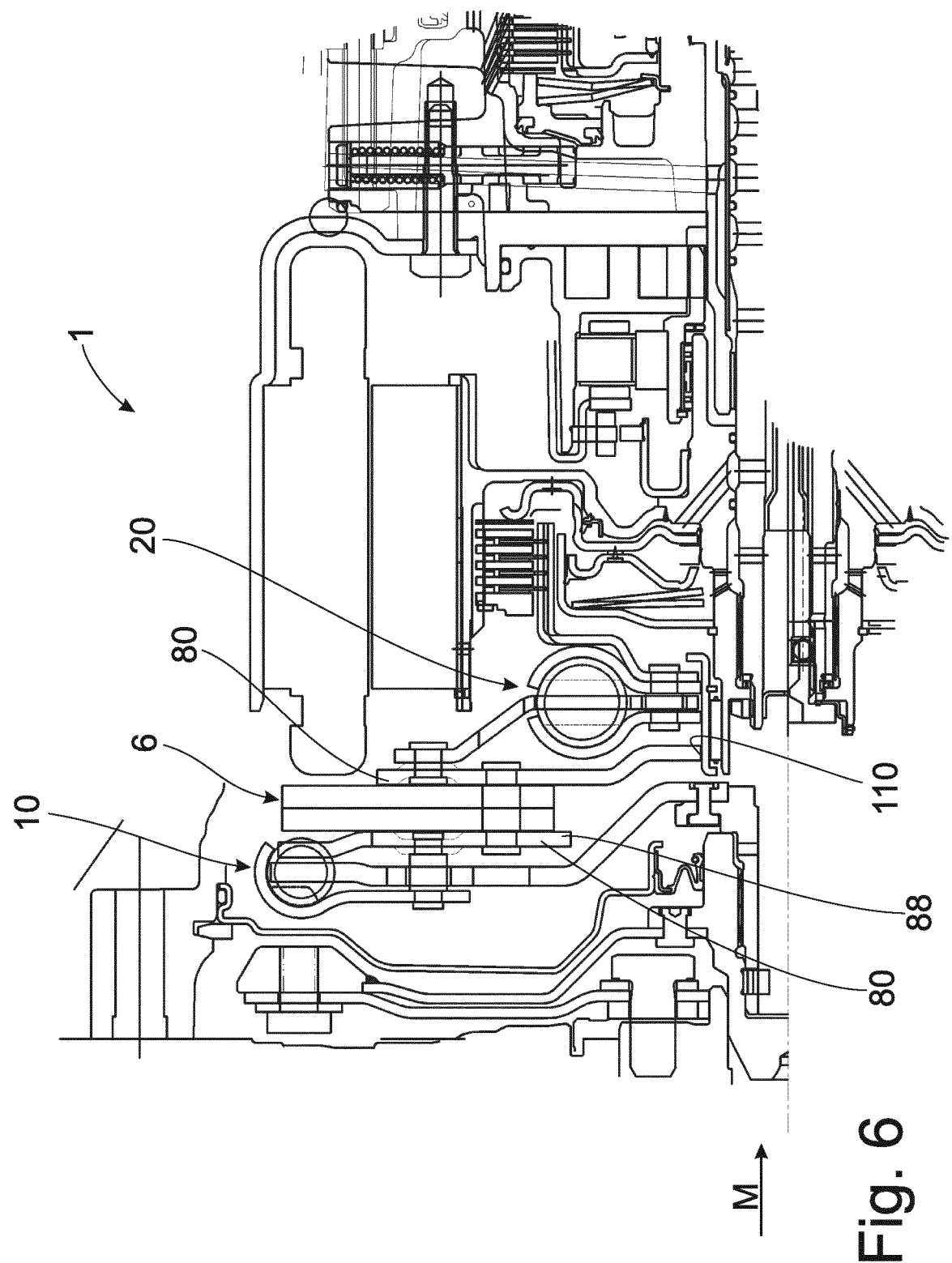

FIG. 6 shows the introduction of torque into the second torsional damper 20 from radially outside analogous to the variant described in FIG. 5. Further, the mass damper unit 6 is centered on the secondary side via a centering seat 110 at the right-hand track plate. The left-hand cover plate 88 of the first torsional damper 10 simultaneously serves as left-hand track plate 80 for the mass damper unit 6.

Figure 7:
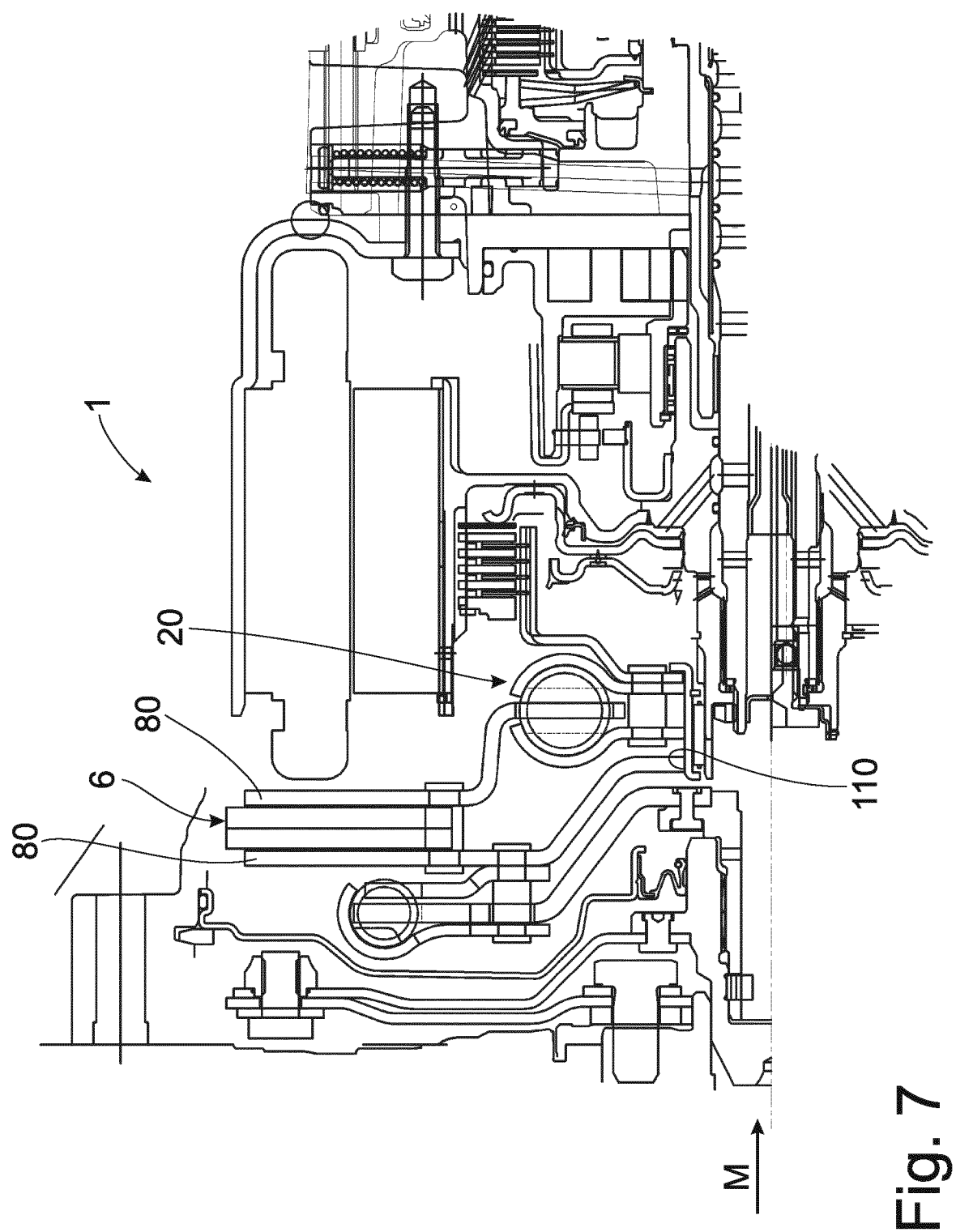

FIG. 7 shows the control of the second torsional damper 10 via the right-hand track plate 80 of the mass damper unit 6, which track plate 80 is sharply offset for this purpose. The centering 110 of the mass damper unit is carried out on the secondary side via the left-hand track plate 80.

Figure 8:
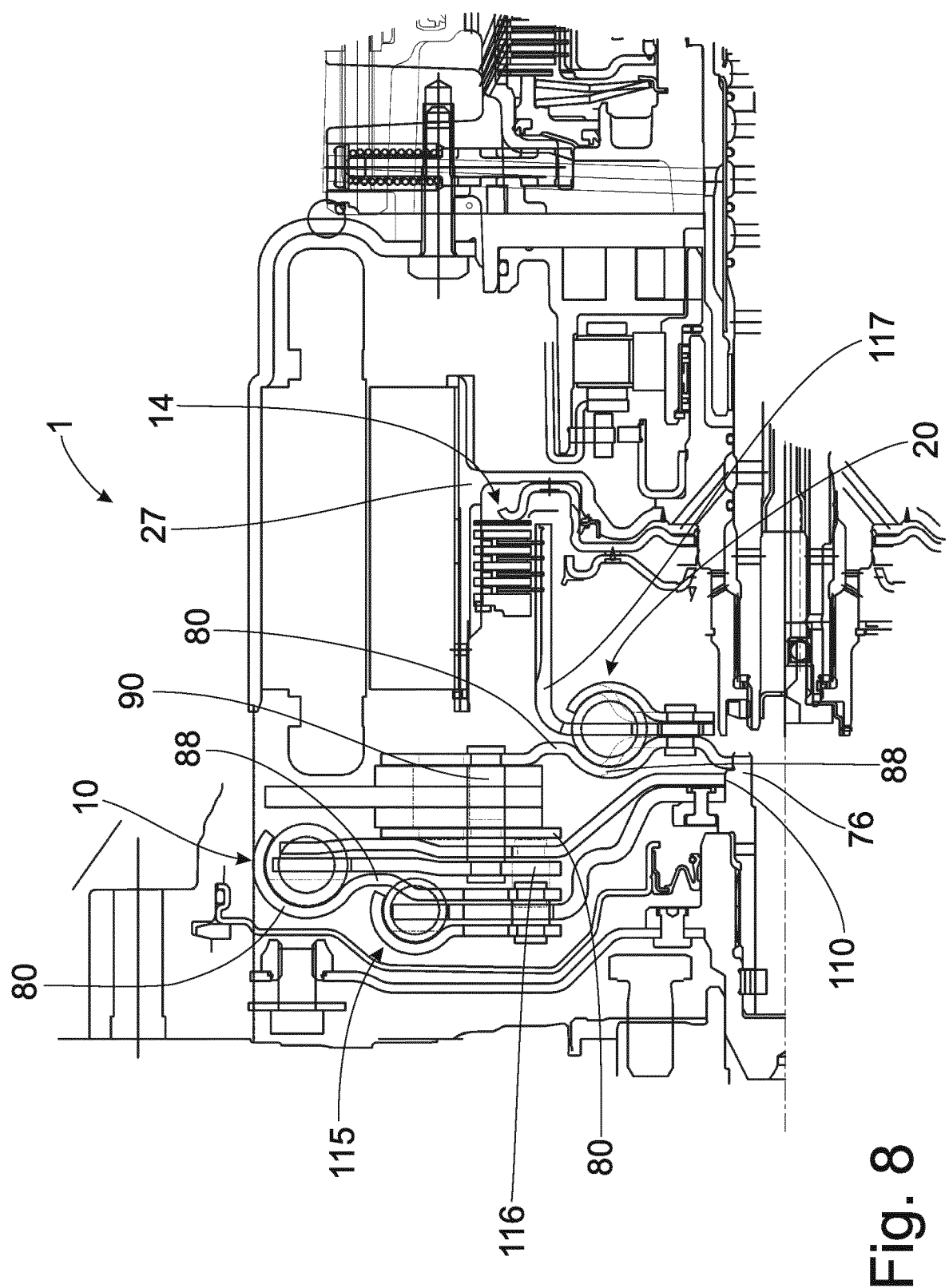

FIG. 8 shows a variant for improved decoupling of rotational irregularities in which an additional damper/pre-damper 115 is arranged upstream of the first torsional damper 10. The right-hand cover plate 88 of the pre-damper 115 forms the left-hand cover plate 88 of the first torsional damper 10. The centering 110 of the first torsional damper 10 is carried out on the primary side at the torsional damper hub 76 via the right-hand cover plate 88. The mass damper unit 6 is connected to the hub disk 116 of the first torsional damper 10 via a plurality of long spacer pieces 90. The torque is conveyed into the second torsional damper 20 and the primary-side centering of the mass damper assembly 6 is carried out via the right-hand track plate 80. In contrast to the preceding variant, the right-hand track plate 80 in this instance constitutes the left-hand cover plate 88 of the second torsional damper 20. In contrast to the variants shown heretofore, the hub disk 117 of the second torsional damper 20 simultaneously serves as the inner disk carrier 27 for conducting torque into the disconnect clutch K0 14.

Figure 9:
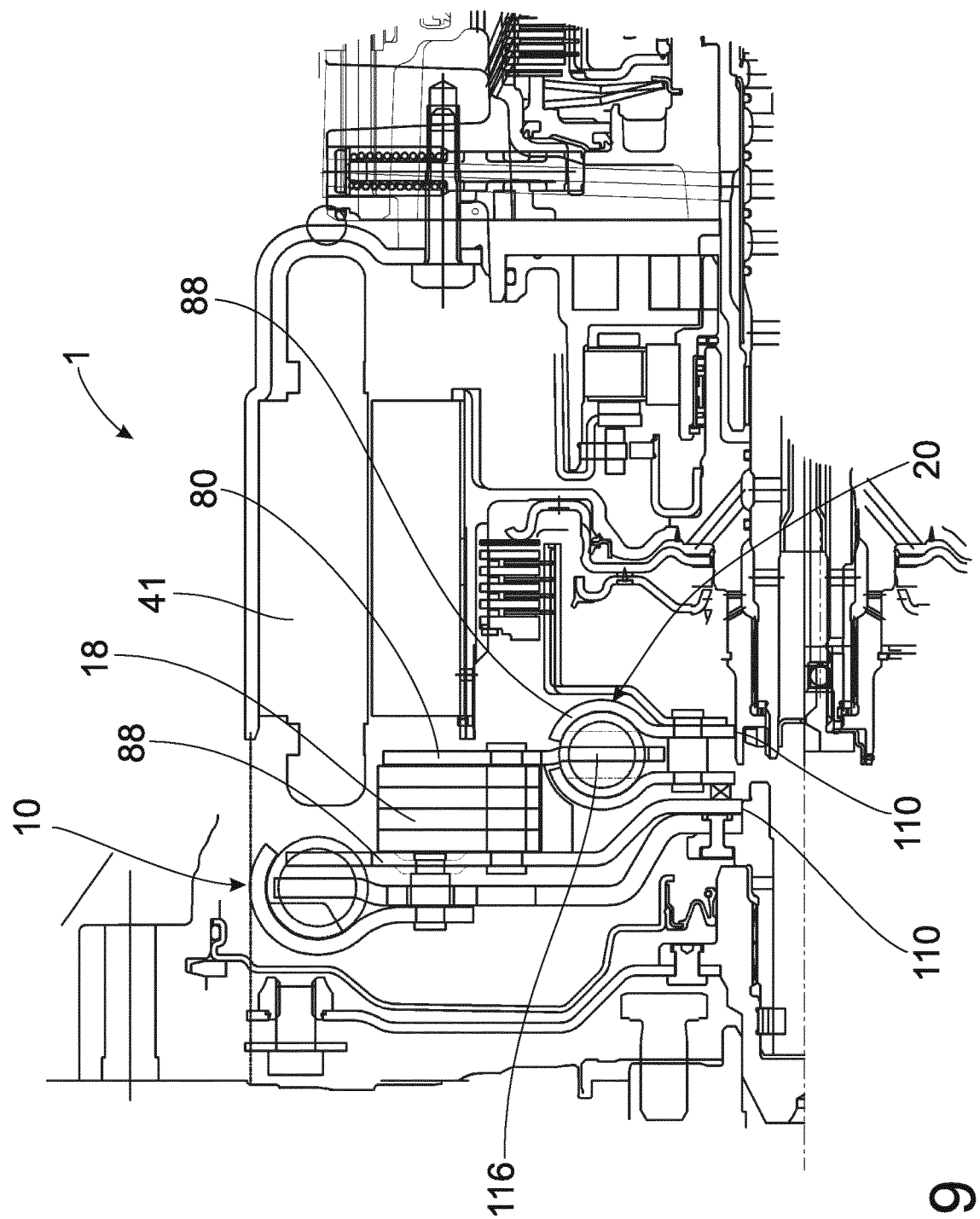

For purposes of a larger-dimensioned first torsional damper 10, FIG. 9 shows a construction with damper masses 18, which are formed to be shorter radially such that they can be positioned under the stator 41 of the electric machine. In this variant, the right-hand cover plate 88 of the first torsional damper 10 serves at the same time as left-hand track plate 80, while the right-hand track plate 80 simultaneously serves as the hub disk 117 of the second torsional damper 20. The centering 110 of the first torsional damper 10 is carried out on the primary side via the left-hand track plate 88, while the centering 110 of the second torsional damper 20 is carried out on the secondary side via the right-hand cover plate 88.

Figure 10:
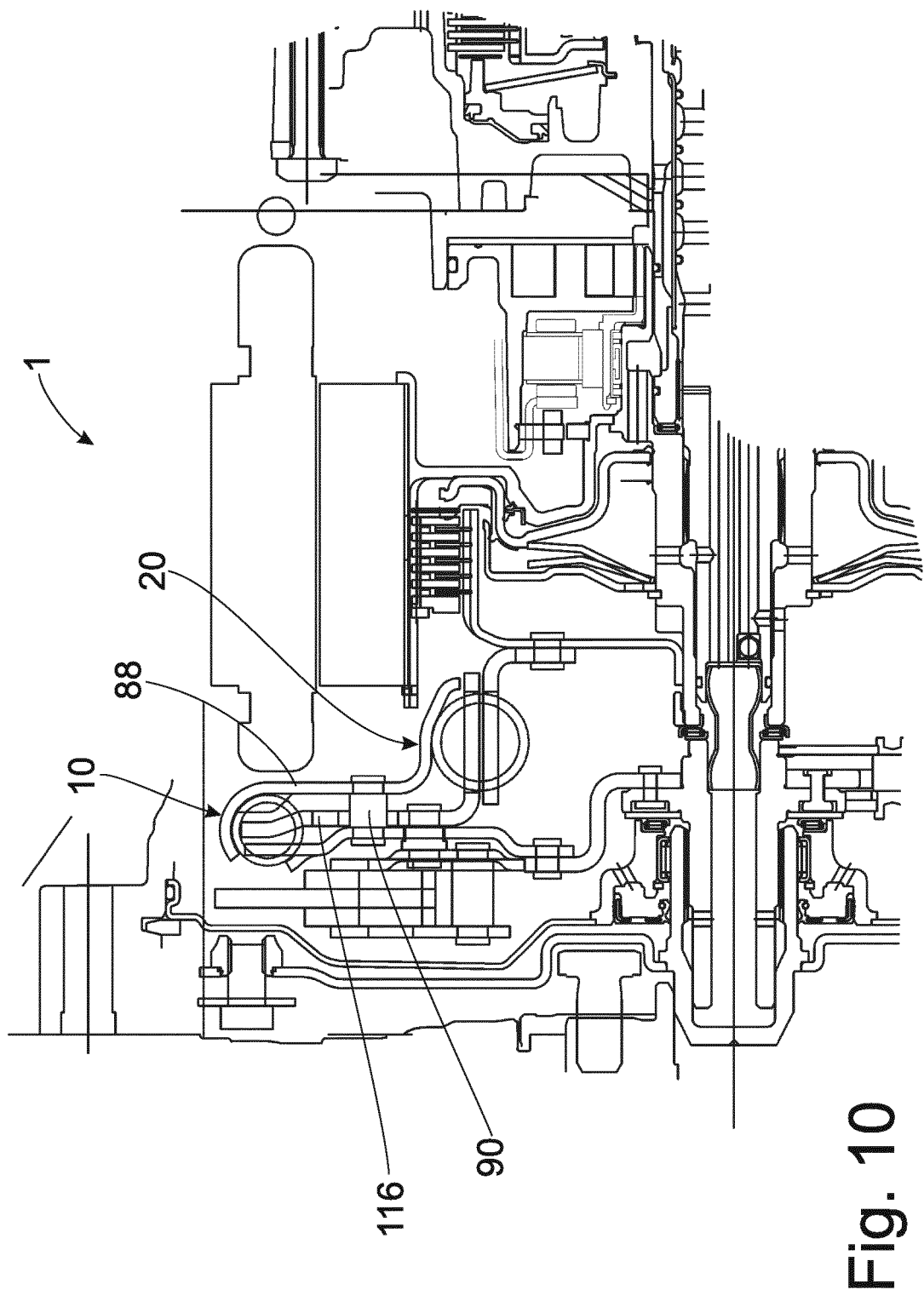

Compared to the previous variants, FIG. 10 shows a variant with a radial centrifugal force support of the second torsional damper 20 through the right-hand cover plate 88 of the first torsional damper 10. The mass damper unit 6 is riveted to the hub disk 116 of the first torsional damper 10 via a plurality of spacer pieces 90. The advantage in this construction consists in the small number of component parts for realizing the full functionality of the torsional vibration damping unit.

Figure 11:
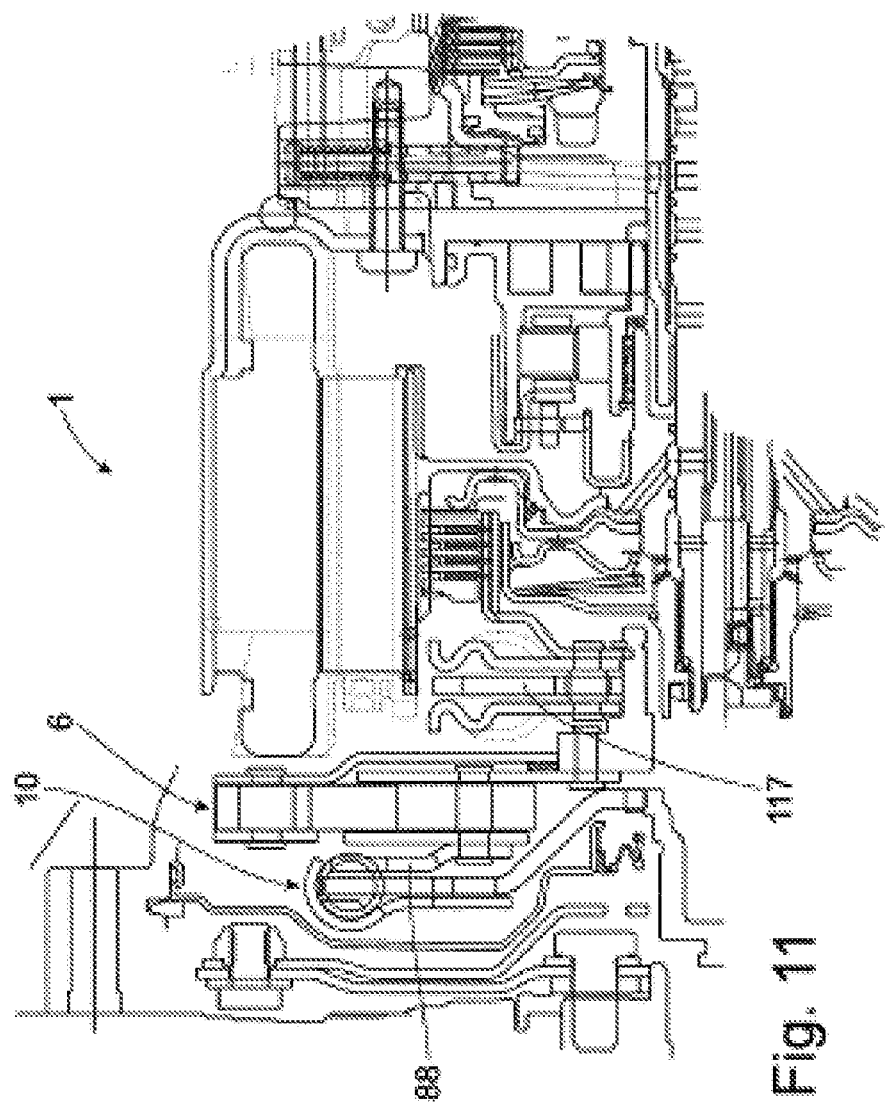

FIG. 11 shows a variant as already described in FIG. 2. In this case, however, the mass damper unit 6, which has been constructed heretofore as a speed-adaptive mass damper, is now constructed as a variable speed fixed mass damper. The control of the mass damper 6 is carried out via the cover plate 88 of the first torsional damper 10. The torque is conveyed from the mass damper 6 to the torsional damper hub 118 of the second torsional damper 20 via a rivet connection.

Figure 12:
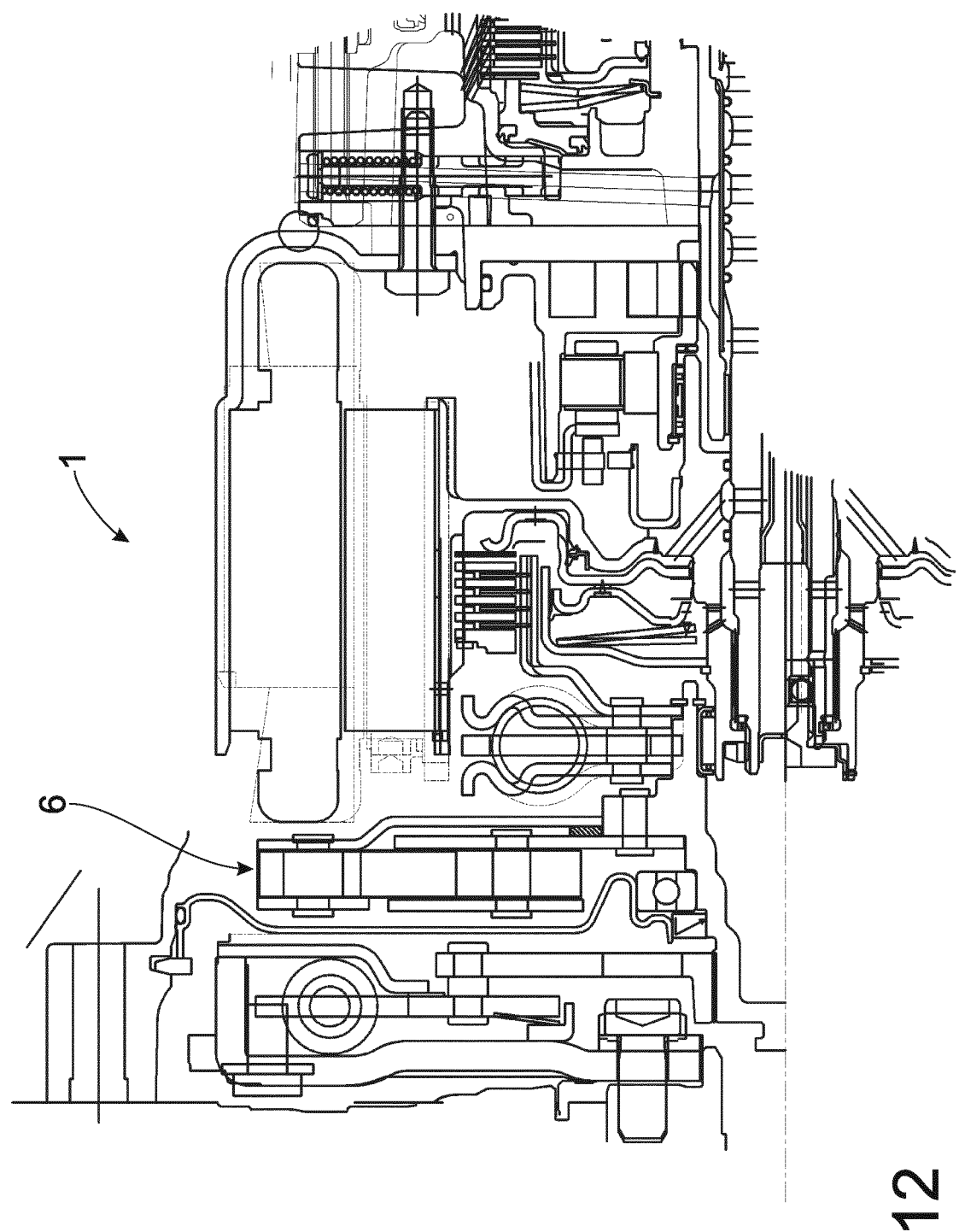

FIG. 12 is based on FIG. 4. In this case, however, the mass damper unit 6, which was constructed in FIG. 4 as a speed-adaptive mass damper, is now constructed as a variable speed fixed mass damper. The advantage in these arrangements consists in the very high quality of decoupling of rotational irregularities and a very efficient use of installation space. It is further advantageous that the variable speed fixed mass damper inherently provides a very high decoupling quality even at low engine speeds.

Figure 13:
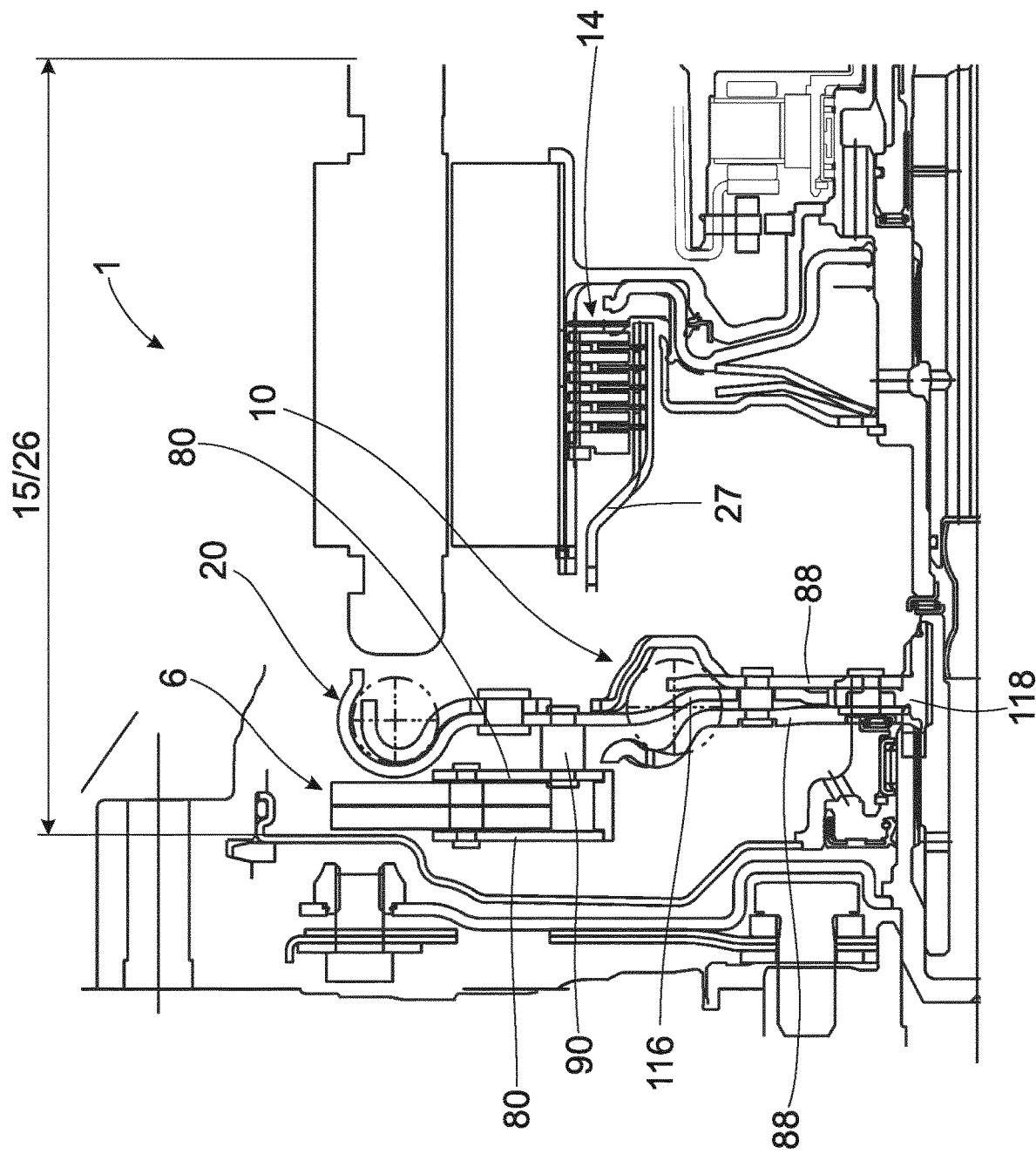

FIG. 13 shows another possible construction of a torsional vibration damping unit 15 in the oil mist-containing working space 26. The introduction of torque is carried out via cover plates 88, which are riveted to a torsional damper hub 118 in the first torsional damper 10. A second torsional vibration damper 20 is controlled via a hub disk 116. In contrast to the variants described heretofore, the second torsional damper 20 is located radially farther outside than the first torsional damper 10. The torque is conveyed into the disconnect clutch K0 14 via an inner disk carrier 27.

The mass damper unit 6, which is constructed in this case as a speed-adaptive mass damper, is connected to the hub disk 116 via a plurality of spacer pieces 90. The advantage here consists in the use of inexpensive, planar track plates 80, which can be constructed as carryover parts. Further, the inexpensive spacer pieces 90 allow a flexible connection to the existing installation space so that different modular solutions can be covered in a simple manner.

Figure 14:
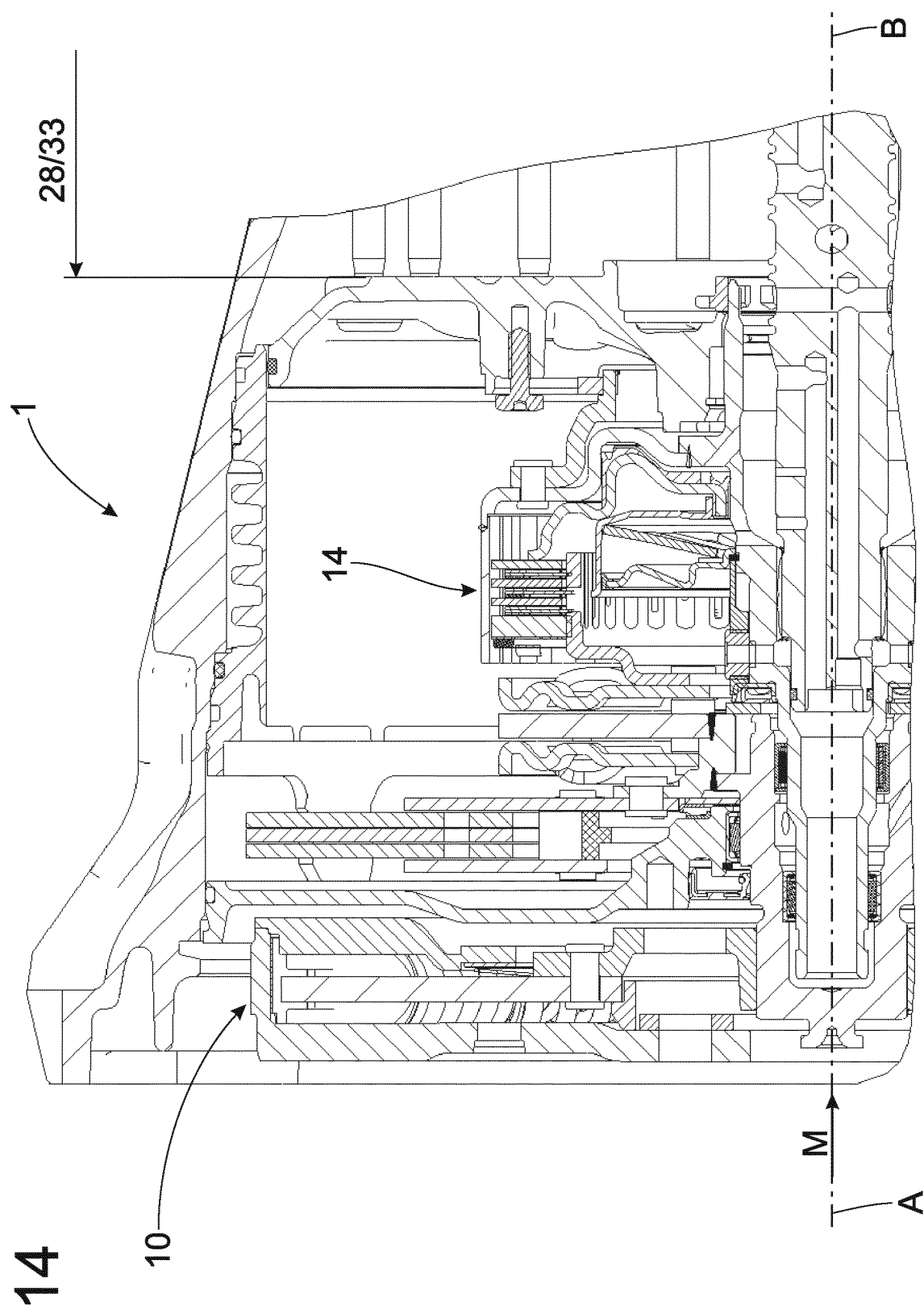

FIG. 14 shows an embodiment form of a torque transmission arrangement 1 such as that already described extensively in FIG. 1 but without the electric drive unit 40. The disconnect clutch 14 can be used as a starting clutch for a starting process, or it is also possible for the disconnect clutch 14 to be permanently closed and the starting process is carried out via an internal starting element which is positioned in the gear unit 33. The advantage in this variant is that the gear unit 33 is constructed as an automatic planetary transmission, also known as automatic transmission, not shown, wherein the existing brakes can be used as starting element.

Further, the disconnect clutch 14 or another clutch in the torque path M can be used to introduce an additional permanent, controlled or unregulated slip into the torque path M to further reduce torsional vibrations that could not be damped or absorbed by the above-mentioned vibration reducing systems such as first spring set 10, constructed here as dual mass flywheel, mass damper unit 6, constructed here as speed-adaptive mass damper, or second spring set 20.

Figure 15:
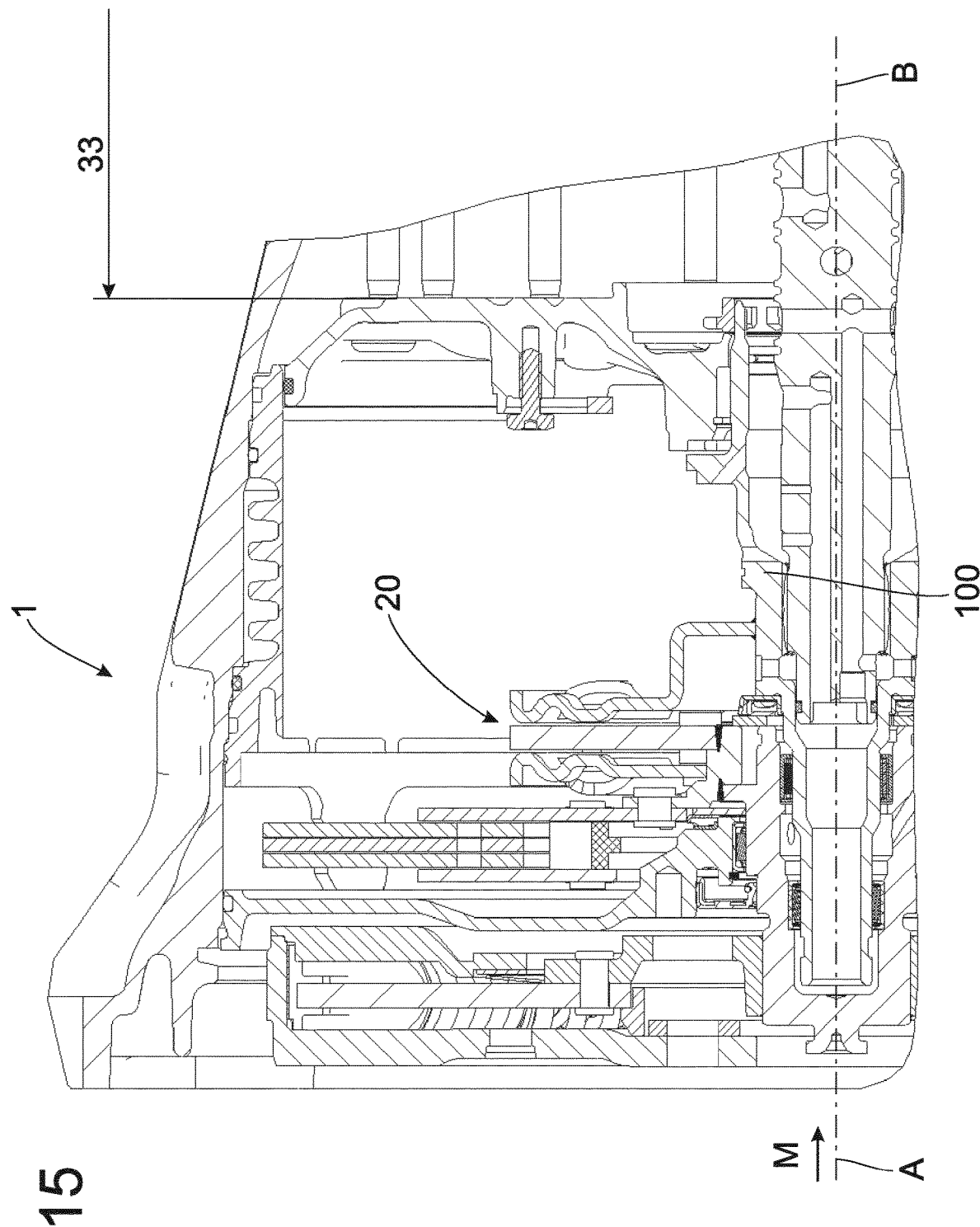

FIG. 15 shows an embodiment form of a torque transmission arrangement 1 as already extensively described in FIGS. 1 and 14, but without the disconnect clutch K0 14. Accordingly, the second spring set 20 is directly connected to the transmission input shaft 100 so as to be fixed with respect to rotation relative to it. A starting process can be carried out via an internal starting element positioned in the gear unit 33. The advantage in this variant is that the gear unit 33 is constructed as an automatic planetary transmission, also known as automatic transmission, not shown, and the existing brakes can be used as starting element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque transmission arrangement for a powertrain of a motor vehicle, comprising:
    an input area which is rotatable around a first rotational axis;
    an output area which is rotatable around a second rotational axis;
    a torque path running from the input area to the output area;
    a torsional vibration damping unit positioned along the torque path between the input area and the output area, wherein the torsional vibration damping unit provides a first spatial area and an adjoining second spatial area along the torque path; and
    a gear unit positioned along the torque path between the input area and the output area following the torsional vibration damping unit, wherein the gear unit provides an adjoining third spatial area,
    wherein the first spatial area is a dry space, the second spatial area is a moist space, and the third spatial area is a wet space,
    wherein the moist space contains an oil mist,
    wherein a mass damper unit, configured as one of a speed-variable mass damper, a fixed-frequency mass damper, or a mass damper for two or more engine orders, is arranged in the second spatial area in torque path.

2. The torque transmission arrangement according to claim 1, wherein at least one of an axial offset compensation unit, an angular offset compensation unit, and a first spring set is arranged in the first spatial area in the torque path.

3. The torque transmission arrangement according to claim 2, wherein the first spring set is formed of one or more rows.

4. The torque transmission arrangement according to claim 1, wherein one of a second spring set or further spring sets is or are arranged in the second spatial area downstream of the mass damper unit in torque path.

5. The torque transmission arrangement according to claim 4, wherein the one of the second spring set or the further spring sets is formed in one or more rows.

6. The torque transmission arrangement according to claim 1, wherein the gear unit comprises a transmission arrangement configured as an automatic planet gear transmission or a manual or automatic shift transmission.

7. The torque transmission arrangement according to claim 1, wherein the first spatial area is separated from the second spatial area by a separate separating element.

8. The torque transmission arrangement according to claim 1, wherein an electric drive unit is arranged in the torque path in at least one of the first spatial area and the second spatial area.

9. The torque transmission arrangement according to claim 8, further comprising:
    a disconnect clutch arranged in the torque path upstream of the electric drive unit, wherein the disconnect clutch is configured to interrupt the torque path from the input area to the output area, and a torque (Me) generated by the electric drive unit runs to the output area.

10. The torque transmission arrangement according to claim 9, wherein the disconnect clutch is configured to conduct one of a torque or torque components (Ma) from the input area to the output area.

11. The torque transmission arrangement according to claim 1, wherein the first rotational axis extends one of coaxial to the second rotation axis or extends at an axial offset to the second rotational axis.

12. The torque transmission arrangement according to claim 1, wherein the gear unit provides a starting element in the torque path.

13. A torque transmission arrangement for a powertrain of a motor vehicle, comprising:
    an input area which is rotatable around a first rotational axis;
    an output area which is rotatable around a second rotational axis;
    a torque path running from the input area to the output area;
    a torsional vibration damping unit positioned along the torque path between the input area and the output area, wherein the torsional vibration damping unit provides a first spatial area and an adjoining second spatial area along the torque path;
    a separate separating element configured to separate the first spatial area from the second spatial area; and
    a gear unit positioned along the torque path between the input area and the output area following the torsional vibration damping unit, wherein the gear unit provides an adjoining third spatial area,
    wherein the first spatial area is a dry space, the second spatial area is a moist space, and the third spatial area is a wet space,
    wherein the moist space contains an oil mist,
    wherein the separating element is provided with a radially outwardly circumferential seal.

14. The torque transmission arrangement according to claim 1, wherein the second spatial area is separated from the third spatial area by one of:
    a separate separating element,
    a separating element formed integrally with a housing element of the torsional vibration damping unit, or
    a separating element formed integrally with a housing element of the gear unit.

15. The torque transmission arrangement according to claim 14, wherein the housing element of the torsional vibration damping unit and the housing element of the gear unit are formed integrally.

16. A torque transmission arrangement for a powertrain of a motor vehicle, comprising:
    an input area which is rotatable around a first rotational axis;
    an output area which is rotatable around a second rotational axis;
    a torque path running from the input area to the output area;
    a torsional vibration damping unit positioned along the torque path between the input area and the output area, wherein the torsional vibration damping unit provides a first spatial area and an adjoining second spatial area along the torque path; and a gear unit positioned along the torque path between the input area and the output area following the torsional vibration damping unit, wherein the gear unit provides an adjoining third spatial area, wherein the gear unit provides a starting element in the torque path, wherein the first spatial area is a dry space, the second spatial area is a moist space, and the third spatial area is a wet space, wherein the moist space contains an oil mist, wherein the starting element is one of a friction clutch, a multiple plate clutch, or a multiple disk brake.

17. The torque transmission arrangement according to claim 8, wherein the electric drive unit comprises a rotor and a stator, wherein the rotor is arranged in the torque path.

* * * * *